United States Patent [19]

Leaute

[11] 4,251,668

[45] Feb. 17, 1981

[54] SUBSTANCE DESIGNED TO BE USED IN THE PRODUCTION OF ALCOHOLIC LIQUIDS AND PROCESS

[75] Inventor: Robert Leaute, Cognac, France

[73] Assignee: Seguin et Cie, France

[21] Appl. No.: 922,683

[22] Filed: Jul. 7, 1978

[30] Foreign Application Priority Data

Jul. 7, 1977 [LU] Luxembourg ................. 707

[51] Int. Cl.³ .............................................. C07C 69/88
[52] U.S. Cl. ...................................................... 560/69
[58] Field of Search ......................................... 560/69

[56] References Cited

PUBLICATIONS

C. A. 89: 4574a, Bozhinov, A. et al., Lozar. Vinar, (1977), 26(8), 34–38.

*Primary Examiner*—Paul J. Killos
*Attorney, Agent, or Firm*—Fleit & Jacobson

[57] ABSTRACT

A process for extracting components of wood which can be used in the production of alcoholic liquids and the resulting product. The extract imparts characteristics to the liquid similar to those obtained in the course of natural aging. The process involves a multi-stage extraction with aqueous solvents, the last stage being conducted under pressure.

12 Claims, No Drawings

SUBSTANCE DESIGNED TO BE USED IN THE PRODUCTION OF ALCOHOLIC LIQUIDS AND PROCESS

The present invention relates to a process for extracting components of wood and, in particular, of oak, which can be used in the production of alcoholic liquids such as alcoholic drinks and in products obtained in the course of this process.

The invention relates, more particularly, to a process for extracting components of wood to obtain an extract which imparts characteristics similar to those obtained in the course of natural aging to the alcoholic liquids to which it is added.

Different processes are known which permit the accelerated aging of brandies. It has been proposed to store brandies in containers of either glass or a material which permits the passage of actinic radiation in the presence of thin disks of wood, such as the heart of oak, to age the brandies rapidly. Such a process is described, specifically, in French Pat. No. 1,252,201.

Another process involves the addition of extracts of oak to alcoholic drinks. These extracts are produced by soaking wood chips in a hydroalcoholic medium rich in alcohol, optionally followed by a water lixiviation. Such a process is described, specifically, in French Pat. No. 1,164,437.

These processes however, have the disadvantage that they do not permit the extraction of all the components which are usually extracted during a prolonged storage period in casks, such as those made of oak.

If, incidentally, it were possible to employ the presently available analytical techniques to discover at least the major portion of the components present in naturally aged alcoholic liquors, and further, if it were possible to synthesize these components, their addition or addition of components obtained by treating vegetable materials other than oak in proportions determined by analytic methods is entirely impractical because of the strict legislative control in the foods sector, which prohibits even the presence of any trace of certain compounds and compounds not conforming to the requirement of conserving in alcoholic liquors, especially high quality alcoholic liquors, the natural properties conferred by aging in oak casks.

The preparation of extracts designed to confer on alcoholic liquids characteristics similar to those obtained by natural aging is further complicated by the large number of extractable components, especially for oak wood, all of which are not extracted during the natural aging process. For example, from oak wood, it is possible to extract phenolic derivatives called tannins, organic acids such as carboxylic acids or amino acids, sugars obtained essentially by the reduction of half-cellulose, lignin derivatives, pectins, gums, oleoresins and alkali or alkaline-earth metals such as calcium, potassium, and sodium.

The problem was, therefore, to find a method of extracting the components of wood such as is usually used in casks for storing alcoholic drinks which must be aged, and limiting the extraction to the majority of the compounds usually extracted during the natural aging process. The method, in addition, could not employ solvents which are unacceptable for use in foods or which are banned by legislation concerning the specific liquid or alcoholic drink to be aged.

The present invention therefore has as an object the provision of a process for extracting components of wood to obtain an extract which confers characteristics similar to those resulting from a natural aging to alcoholic liquids to which it is added.

Another object of the present invention is the product or "wooded" ingredient prepared in accordance with this method.

Other objects of the invention will become apparent from the description and the examples which follow.

The process according to the present invention, which consists in extracting from wood usually used for casks for aging alcoholic liquids, comprises in a first stage, extracting the phenolic derivatives and the sugars of said wood with a solvent which is acceptable for foods at a temperature between about 80° and 100° C., and, in a second stage, partially extracting lignin and its derivatives under pressure with a solvent acceptable for foods under temperature conditions permitting the partial caramelization of the sugars present, but avoiding their carbonization.

The wood used in the process according to the present invention is, preferably, oak shavings obtained during the production of cask staves. It is also possible to use unprocessed wood which has previously been dried and stripped of sapwood. Finally, the shavings and clippings from the staves of the cooperage may be used to produce the extracts according to the present invention; these extracts are still called "wooded" ingredients.

According to the preferred production process of the present invention, the wood is divided and is transformed into shavings, chips, fiber and coarse sawdust having a granulometry which permits drainage of the solvent through the mass of wood.

Wood thus prepared may also undergo various treatments to improve the extraction or to guide it in a certain direction. It is possible to store this wood in open air for at least three years so it undergoes washing, various chemical changes, and natural aging.

It is also possible to subject the wood, independently or in addition to the above mentioned treatments, to different treatments having no harmful effect on the final product, such as spraying, soaking to catalyze enzyme reactions under certain pH and temperature conditions, scorching similar to that carried out inside the casks, roasting, radiating the wood with ultra-violet rays, subjecting the wood to ultra-sound action to break up its structure or freezing to disorganize the wood.

The solvent used during extraction is preferably water and, more preferably, demineralized or distilled water, the latter two substances being employed to limit the concentration of alkaline or alkaline-earth ions in the final extract. It is also possible to use a hydroalcoholic medium which may be brandy, on the condition that it is conducted without distillation and in a closed container.

It is also possible to use other solvents usually used in extraction techniques, on the condition that they satisfy the requirements of the legislation covering food products and that they can be totally removed.

Extraction is preferably carried out in static or dynamic extractors optionally equipped with accessory instruments which improve the circulation of the solvent, such as a recycling pump. This extractor may work in the open air or under pressure and is, preferably, constructed of stainless steel. It is also possible to use copper extractors.

It is desirable in certain cases to introduce some copper turnings into the reactor. These turnings should be added in a sufficient quantity to maintain the concentrations introduced into the wooded ingredient within the acceptable limits for food products. The added copper, either in the form of turnings or as part of the framework of the reactor, plays a role as an anti-froth agent and as a catalyst in the extraction process according to the present invention.

The extraction of phenolic derivatives and of sugars from treated wood, and specifically from oak, is accomplished by placing the wood in a solvent such as that defined above and allowing it to soak for a certain time at a temperature between about 80° and 100° C. The temperature must be, preferably, lower than the boiling point of the solvent. This extraction may be carried out in the open air or in an autoclave.

This extraction operation may be repeated several times with a new solvent and may be carried out for different time periods such as 5 to 10 hours. The partial extraction of lignin and its derivatives is carried out under pressure and, preferably, under a pressure between 1.5 and 5 bars with a solvent such as water, preferably demineralized water, a hydroalcoholic mixture with a brandy base or by means of the wooded ingredient resulting from the prior extraction. The temperature in the course of this extraction is lower than the temperature of carbonization of the six-carbon containing sugars which may be present in the extracts, and preferably, the temperature is between 130° and 150° C.

These operating conditions may nevertheless vary according to the nature of the wood being treated. The extraction must, however, be carried out so as to obtain a weak extraction of lignin and to initiate its breakdown into aromatic aldehydes, i.e., vanillin, ethylvanillin, syringaldehyde, coniferaldehyde, and synapaldehyde.

It is desirable, according to the invention, to obtain an extract having a vanillin content of between, preferably, 30 mg per liter and 100 mg per liter.

According to the desired final product, i.e., according to the characteristics which one wishes to confer on the alcoholic liquor, suitable proportions of the fractions of the solutions recovered at the time of the above extraction techniques may be mixed.

Thus, in conducting a three-phase extraction of the phenolic derivatives and of the sugars under the above mentioned conditions and finally extracting a fourth phase under pressure under the temperature conditions indicated above to partially extract lignin and its derivatives, the four resulting extraction liquids (the four phases defined above) are mixed to form a final standard product having the characteristics desired for conferring on the alcoholic liquid, to which it is added, characteristics similar to those of the same liquid aged naturally in casks of the extract wood. One adds $W\%$ of the first phase, $X\%$ of the second phase, $Y\%$ of the third phase and $Z\%$ of the fourth phase according to the ultimate make-up of the composition. Those skilled in the art can prepare a mixture possessing these characteristics using extracts obtained as mentioned above.

The fractions of the different recovered extracted solutions may undergo a maturation process which may be carried out by gentle boiling, refluxing, or concentrating. This operation may be carried out according to the product which one desires to obtain with either recycling or elimination of the vapours of the product.

It is possible, according to a preferred embodiment of the present invention, to conduct the concentration in a vacuum to avoid carbonization of the sugars.

A dry extract based on the product obtained through this procedure may be transformed into a powder by lyophilization and atomization.

This extract may then be added to alcoholic liquids to confer thereto properties similar to those resulting from natural aging.

If one desires, the final product may be sterilized by any of the well known techniques.

The product, which constitutes another object of the present invention results from the final extraction, i.e., from the partial extraction of lignin and of its derivatives under the above mentioned conditions, this extraction being preceded by the extraction of the phenolic derivatives and of sugars.

This substance, destined to be used as an additive to alcoholic liquids and which constitutes an object of the invention, has a vanillin concentration between about 30 and 100 mg/l, a tannin concentration between about 8 and 42 g/l and a 5-hydroxy methyl furfural concentration between about 0.5 and 50 mg/l.

The product has an ultra-violet absorption spectrum having a first maximum absorption at a wavelength of about 205 nm, a second maximum absorption at a wavelength of about 280 nm and a shoulder wavelength of about 225 to 230 nm.

This product, as apparent from the preceding description, is mainly designed to be used in combination with the other extracts obtained in the course of the above mentioned preliminary extractions, with an objective of producing a "wooded" ingredient to be added to alcoholic liquids, in particular, to brandies, with the aim of giving them characteristics similar to those resulting from natural aging.

This mixture may be used as it is or, after maturation under the above-mentioned conditions and, possibly, atomization or lyophilization. The mixture must contain at least the complex product resulting from the partial extraction of lignin.

The following example is designed to illustrate the present invention and is not intended as a limitation thereon.

It is, of course, self-evident that those of ordinary skill in the art can modify either the nature of the wood which is treated or the ultimate composition or use of the extract, while still remaining within the scope of the present invention.

EXAMPLE

The heart of oak stored in the open air for three years was cut by means of a mechanical chopper into chips having the following average dimensions: length about 3 cm, width about 2 cm, thickness about 0.5 cm. Chips having smaller dimensions led to less satisfactory drainage of the solvent.

These chips were then impregnated with dimineralized water the day before extraction in a copper container.

A perforated basket containing the impregnated chips of heart of oak was introduced into an extractor having a structure similar to that of an autoclave of stainless steel and demineralized water was added. The temperature of the solvent and of the chips was maintained at 35° to 40° C. for 12 hours to carry out the enzyme reactions.

The first phase of the present process was conducted by increasing the temperature of the entire mixture to about 80° to 100° C. without ever reaching the boiling point. A recycling pump was used to draw the liquid from the base of the extractor and to pump it intermittently to the upper part. These operations were carried out for 8 hours. The solvent was then removed and replaced by fresh water, and the same operations were repeated the next day.

Similar extractions in a second and a third phase were conducted. The extracts of these three phases were stored in separate containers.

The fourth phase was conducted under pressure by maintaining the mixture for about 8 hours at a temperature of about 140° C. under a pressure of about 2.5 bars. The extract thus obtained was also stored in a container.

This extract has a vanillin content of about 40 mg/l, a content in total tannins of about 16 g/l and a 5-hydroxy methyl furfural content of about 24 mg/l.

The ultra-violet absorption spectrum shows a maximum first absorption at 205 nm and a second at 280 nm, and a shoulder wavelength at 225-230 nm.

The four extracts thus obtained, resulting from the four above mentioned phases, were then mixed together according to the ultimate composition and use of the mixture.

Thus, a mixture containing 15% of the first phase, 35% of the second phase, 30% of the third phase and 20% of the fourth extract was prepared. This liquid was maintained at its boiling point for 2 hours.

The mixture was then concentrated under vacuum in the same apparatus mentioned above at about 60° C. under a pressure of several millimeters of mercury. The product thereby obtained was a suspension which could undergo clarification.

The product thereby obtained, when added to a brandy, conferred a taste and characteristics which to those resulting from aging for several years in a cask of oak.

What is claimed is:

1. A product extracted from wood for conferring to alcoholic liquids characteristics similar to those obtained in natural aging, the product comprising between about 30 and 100 mg/l of vanillin, between about 8 and 42 g/l of tannin and, between about 0.5 and 50 mg/l of 5-hydroxymethyl furfural, said product having an ultraviolet absorption spectrum showing a first maximum wavelength at about 205 nm, a second maximum wavelength at about 280 nm and a shoulder wavelength at about 225 to 230 nm.

2. The product of claim 1 which is extracted from oak.

3. A process of extracting a product from wood for conferring to alcoholic liquids characteristics similar to those obtained by natural aging comprising:

(a) extracting the phenolic derivatives and sugars in the wood by means of an aqueous solvent acceptable to the food industry at a temperature of between 80° and 100° C.; and (b) partially extracting lignin and its derivatives under pressure with an aqueous solvent acceptable to the food industry and under such temperature conditions that the carbonization of the sugars present is avoided and that the partial breakdown of lignin is characterized by a vanillin content of between 30 mg/liter and 100 mg/liter.

4. The process of claim 3 wherein the solvent in (a) is selected from the group consisting of water and hydroalcoholic solution.

5. The process of claim 4 wherein the water is demineralized or distilled water.

6. The process of claim 3, 18 or 19, wherein step (b) is conducted at a pressure between 1.5 and 5 bars and a temperature between about 130° and 150° C.

7. The process of claim 3, wherein the wood is divided heart of oak having such a granulometry as to permit the drainage of the solvent therethrough.

8. The process of claim 3, wherein step (a) is repeated three times prior to the partial extraction of step (b), with the product from each step being kept separately.

9. The process of claim 8 further comprising the steps of mixing the product from each step and maturing the mixture by gentle boiling, refluxing or concentrating.

10. The product of claim 1 in the form of an atomized or lyophilized powder.

11. A process of extracting a product from wood for conferring to alcoholic liquids characteristics similar to those obtained by natural aging comprising:

(a) extracting the phenolic derivatives and sugars in the wood by means of demineralized water at a temperature of from 80° to 100° C.;

(b) removing and storing the demineralized water extractant;

(c) repeating steps (a) and (b) twice to obtain two additional portions of demineralized water extractant; and (d) partially extracting lignin and its derivatives from the wood of step (c) with demineralized water at a temperature of about 140° C. and a pressure of about 2.5 bars to form an extract having a vanillin content of about 40 mg/l, a total tannin content of about 16 g/l, a 5-hydroxy methyl furfural content of about 24 mg/l, an ultra-violet absorption spectrum showing a first maximum absorption at 205 nm, a second maximum absorption at 280 nm, and a shoulder wavelength at 225-230 nm.

12. The product of claim 11 comprising a mixture of 15% of the extraction product obtained in (b), 35% of the first extraction product obtained in (c), 30% of the second extraction product obtained in (c), and 20% of the extraction product of step (d).

* * * * *